United States Patent [19]

Yamamoto et al.

[11] Patent Number: 4,460,753

[45] Date of Patent: Jul. 17, 1984

[54] PROCESS FOR PRODUCING VINYL CHLORIDE POLYMERS IN A COATED REACTOR AND COATING PRODUCT THEREFOR

[75] Inventors: Makoto Yamamoto, Hiratsuka; Akira Nakayama, Yokosuka; Riso Iwata, Tokyo, all of Japan

[73] Assignee: Nippon Zeon Co. Ltd., Tokyo, Japan

[21] Appl. No.: 426,094

[22] Filed: Sep. 28, 1982

[30] Foreign Application Priority Data

Oct. 7, 1981 [JP] Japan ............................. 56-159754
Mar. 31, 1982 [JP] Japan ............................. 57-52675

[51] Int. Cl.$^3$ .......................... C08F 2/24; C08F 2/02; C08F 2/20
[52] U.S. Cl. ............................. 526/62; 526/200; 526/201; 526/202; 528/159; 528/205
[58] Field of Search ............................................. 526/62

[56] References Cited

U.S. PATENT DOCUMENTS 4,256,863  3/1981  McOnie ............................... 526/62

FOREIGN PATENT DOCUMENTS 101889  8/1979  Japan ..................................... 526/62
224798  12/1968  U.S.S.R. ............................... 526/62

Primary Examiner—C. A. Henderson
Attorney, Agent, or Firm—Sherman & Shalloway

[57] ABSTRACT

A process for producing a vinyl chloride polymer which comprises polymerizing vinyl chloride monomer or a mixture of it with another monomer copolymerizable therewith in an aqueous medium or in bulk, characterized in that the inside of the polymerization reactor is coated beforehand with the product of reaction of an oily or waxy cyclopentadiene polymer and a phenolic compound with or without an aldehyde compound.

16 Claims, No Drawings

PROCESS FOR PRODUCING VINYL CHLORIDE POLYMERS IN A COATED REACTOR AND COATING PRODUCT THEREFOR

This invention relates to a method of preventing deposition of polymer scales on the inside of a polymerization reactor, more specifically its inner wall and other parts thereof with which monomer is likely to make contact, in the polymerization of vinyl chloride in an aqueous medium or in bulk.

In the polymerization of vinyl chloride monomer or a mixture of it with another monomer copolymerizable therewith in an aqueous medium or in bulk, film-like or lumpy scales or polymer are liable to deposit on those parts of the polymerization reactor with which the monomer makes contact, for example the inner reactor wall, stirring impellers, baffle plates and the temperature detecting tube. This leads to the disadvantage that the ability of the reactor to remove the heat of the polymerization reaction is reduced, or the scales separated during the polymerization come into the final product to cause fish eyes, for example and thus to degrade its quality. It is the usual practice to clean the inside of the polymerization reactor every time the polymerization is over. The cleaning operation, however, requires a great deal of labor and time, and reduces the operating efficiency of the polymerization reactor. Another defect is that shaving of the scales may result in the damage of the inner reactor wall.

It is an object of this invention therefore to provide a process for producing a vinyl chloride polymer, in which the deposition of scales on the inside of the polymerization reactor is reduced.

The object of this invention is achieved by a process for producing a vinyl chloride polymer which comprises polymerizing vinyl chloride monomer or a mixture of it with another monomer copolymerizable therewith in an aqueous medium or in bulk, characterized in that the inside of the polymerization reactor is coated beforehand with the product of reaction of an oily or waxy cyclopentadiene polymer and a phenolic compound with or without an aldehyde compound.

The oily or waxy cyclopentadiene polymer used as one starting material for the scale deposition inhibitor in accordance with this invention can be obtained by a known method, for example by heat-polymerizing, or cationically polymerizing, a cyclopentadiene monomer or a mixture of it with a comonomer in the presence or absence of an inert solvent such as benzene, toluene or xylene. The cyclopentadiene monomer is selected from cyclopentadiene, lower alkyl (e.g., methyl or ethyl)-substituted cyclopentadiene, lower Diels-Alder adducts thereof such as dimers, trimers or codimers, and mixtures thereof. The comonomer is selected from monoolefins such as ethylene, propylene, butene, pentene, styrene and alpha-methylstyrene; conjugated dienes such as 1,3-butadiene, isoprene and 1,3-pentadiene; vinyl monomers having a polar group such as vinyl acetate, vinyl propionate, acrylic esters, methacrylic esters, acrylonitrile, acrolein, and allyl alcohol; and phenols such as phenol, cresol and hydroxystyrene. The oily polymer has a viscosity at 25° C. of usually 100 to 50,000 centipoises, preferably 300 to 30,000 centipoises, and the waxy polymer has a melting point of usually not more than 140° C., preferably not more than 100° C. The use of a resinous polymer instead of the oily or waxy polymer is undesirable since its reactivity with the phenolic compound is poor.

Illustrative of the phenolic compound as the other starting material for the scale deposition inhibitor in accordance with this invention are monohydric phenols such as phenol, cresol, p-chlorophenol, p-bromophenol, tert.-butyl phenol, octyl phenol and xylenol; dihydric phenols such as bisphenol A, bisphenol F, resorcinol, hydroquinone, catechol, dihydroxytoluene, orcinol and toluhydroquinone; and the trihydric phenols such as pyrogallol, hydroxyhydroquinone and phloroglucinol.

The reaction product of the cyclopentadiene polymer and the phenolic compound can be obtained by subjecting them to alkylation in the presence of an acid catalyst at 120° to 200° C. for 5 minutes to 10 hours. Illustrative of the acid catalyst used in this reaction are various organic and inorganic acids, such as hydrochloric acid, sulfuric acid, p-toluenesulfonic acid, aluminum chloride, ferric chloride, stannous chloride, boron trifluoride and boron tribromide. Of these, p-toluenesulfonic acid is preferred.

The proportions of the phenolic compound and the cyclopentadiene polymer used are usually such that the amount of the latter is 5 to 200 parts by weight, preferably 50 to 150 parts by weight, per 100 parts by weight of the former. If the proportions are outside this range, the effect of the resulting product to inhibit scale deposition is reduced.

The softening point of the reaction product varies depending upon the type of the starting materials. It is 40° to 80° C. when a monohydric phenol is used, and 50° to 120° C. when a polyhydric phenol is used.

As desired, an aldehyde compound may also be used as a reactant in the reaction of the cyclopentadiene polymer and the phenolic compound. Examples of the aldehyde are formaldehyde, paraformaldehyde, acetaldehyde and furfural. The sequence of reaction of these three components is, for example, as follows: (1) The cyclopentadiene polymer, the phenolic compound and the aldehyde compound are simultaneously reacted; (2) the cyclopentadiene polymer is first reacted with the phenolic compound and then the product is reacted with the aldehyde compound; and (3) the phenolic compound is reacted with the aldehyde compound, and then the product is reacted with the cyclopentadiene polymer.

According to the procedure (1), the reaction is performed in accordance with an ordinary process for producing phenolic resins except that it is carried out in the presence of the cyclopentadiene polymer. For example, a resol-type resin is obtained by using 1.1 to 1.5 moles of the aldehyde per mole of the phenolic compound, and reacting the three components at 50° to 95° C. using an alkaline catalyst such as sodium hydroxide, ammonia and an amine. A novolak-type resin is obtained by using 0.5 to 1.1 moles of the aldehyde compound per mole of the phenolic compound and reacting the three components at 50° to 140° C. in the presence of an acid catalyst such as formic acid, oxalic acid, salicylic acid, p-toluenesulfonic acid, hydrochloric acid and sulfuric acid.

According to the procedure (2), the cyclopentadiene polymer and the phenolic compound are first subjected to alkylation at 30° to 150° C. for 5 minutes to 10 hours in the presence of an inorganic base-type Friedel-Crafts catalyst in the presence or absence of an inert solvent to form a modified phenolic compound. Illustrative of the Friedel-Crafts catalyst used in this reaction are the fluorides, chlorides, bromides and iodides of aluminum, boron, iron, zinc, tin, titanium, etc., and complexes thereof. Of these, aluminum halides, boron halides, and complexes thereof, especially aluminum chloride, are preferred. Then, the modified phenolic compound is mixed with the aldehyde compound and reacted under the same conditions as in the procedure (1) to form a resol-type or novolak-type resin.

According to the procedure (3), the phenolic compound and the aldehyde compound are reacted in a customery manner as in (1) above, and the resulting orthomethylol phenol is reacted with the cyclopentadiene polymer under heat. Or after the heat reaction, a fresh supply of the phenolic compound is added and further reacted under heat. Thus, the desired resin can be obtained. The conditions for the heat reaction vary depending upon the type of the desired resin, i.e. whether it is a resol or novolak resin. In the case of the former, the reaction is carried out preferably at a temperature of 50° to 95° C. for a period of 1 to 5 hours; and in the case of the latter, the reaction is carried out preferably at a temperature of 100° to 140° C. for a period of 1 to 5 hours.

The resin obtained by reacting the three components in the above manner is a viscous liquid when it is of the resol type, and a resinous product usually having a softening point of 50° to 120° C. when it is of the novolak type.

When no aldehyde compound is used in this invention, the use of a polyhydric phenol as the phenolic compound is preferred because a greater effect of preventing deposition of scales can be obtained. This is probably because as the number of hydroxyl groups in the reaction product is larger, there is a greater radical inhibiting effect or hydrophilizing effect. On the other hand, when the aldehyde compound is used, a monohydric phenol is preferred in order to inhibit gellation during the preparation of the reaction product.

The reaction product could be directly coated on the required parts of a polymerization reactor. Usually, however, it is applied by spraying, brush coating, etc. in the form of a solution in an aqueous alkali or an organic solvent such as methanol or acetone. The use of aqueous alkali as the solvent is preferred because the coated surface of the inside of the reactor needs not to be dried by heating, but after simple washing with water or neutralizing-washing with a dilute aqueous solution of an acid such as hydrochloric acid, nitric acid, phosphoric acid, carbonic acid, formic acid, acetic acid or oxalic acid, polymerization materials for the next polymerization process can be charged into the reactor and the polymerization can be resumed.

For the ease of the coating operation, the coating solution preferably has a solids concentration in the range of 0.1 to 10% by weight. The amount of coating is not particularly limited, but scale deposition can be inhibited sufficiently if the rate of coating on the inside of the reactor is at least 0.001 g/m$^2$ as solids. The upper limit to the rate of coating may, for example, be more than 1 g/m$^2$ unless any particular adverse effect is anticipated. The coating of the reactor may be performed for every cycle of the polymerization operation. But even by one coating of the reactor with the scale deposition inhibitor in accordance with this invention, the reactor can be used through more than several cycles of the polymerization process without appreciable scale deposition by performing simple washing of the reactor after every cycle.

The process of this invention can be applied not only to polymerization in an aqueous medium, i.e. to suspension polymerization, emulsion polymerization and emulsion-suspension polymerization but also to bulk polymerization. The effect of inhibiting scale deposition is especially outstanding in suspension polymerization.

Examples of the monomer copolymerizable with vinyl chloride monomer in the process of this invention include vinyl esters such as vinyl acetate, alkylvinyl ethers such as cetylvinyl ether, alpha-monolefins such as ethylene and propylene, vinylidene halides such as vinylidene chloride, and alkyl acrylates or methacrylates such as methyl acrylate and methyl methacrylate.

Polymerization chemicals such as initiators, suspending agents and emulsifiers used in this invention may be those which are used in the ordinary polymerization of vinyl chloride in an aqueous medium or in bulk. Illustrative of the polymerization initiators are organic peroxides such as lauroyl peroxide, diisopropyl peroxydicarbonate, di-2-ethylhexyl peroxydicarbonate and t-butyl peroxypivalate; azo compounds such as alpha, alpha'-azobisisobutyronitrile; and inorganic peroxides such as ammonium persulfate and potassium persulfate. Examples of the suspending agents are synthetic polymeric materials such as partially saponified products of polyvinyl alcohol and polyvinyl acetate, cellulose derivatives (e.g., methyl cellulose), polyvinyl pyrrolidone and maleic anhydride/vinyl acetate copolymer, and natural polymeric materials such as starch and gelatin. Examples of the emulsifying agents include anionic emulsifiers such as soduim alkylbenzenesulfonates and sodium laurylsulfate, and nonionic emulsifiers such as polyoxyethylene alkyl ethers and polyoxyethylene sorbitan fatty acid partial esters. As required, a molecular weight controlling agent may be used. The aforesaid initiator, vinyl chloride, other monomer, suspending agent, emulsifier, molecular weight controlling agent, etc. may be added to the polymerization system at a time at the start of the polymerization, or may be added portionwise during the polymerization. The polymerization is carried out usually at a temperature of 35° to 80° C. with stirring.

The process of this invention makes it possible to prevent the deposition of scales effectively and also to retain this effect for an extended period of time, and does not exert adverse effects such as the retarding of the rate of polymerization, the degradation of the particle size distribution and color of the product, or the formation of fish eyes in the product. Accordingly, the process of the invention is very useful in industry.

The following examples illustrate the present invention more specifically. All parts and percentages in these examples are by weight.

REFERENTIAL EXAMPLE 1

A four-necked flask was charged with 100 parts of pyrogallol, 100 parts of an oily cyclopentadiene polymer having a viscosity at 26° C. of about 10,000 centipoises (a copolymer of 50% dicyclopentadiene and 50% 1,3-pentadiene obtained by heat polymerization) and 0.2 part of p-toluenesulfonic acid, and in an atmosphere of nitrogen, they were reacted at 160° C. for 2 hours. After the reaction, the reaction mixture was cooled to below 100° C., and then 400 parts of water was added to wash it. The supernatant liquid was separated. The residue was dehydrated and concentrated at a pressure of 75 mmHg. The concentration was terminated when the temperature of the product reached 150° C. A deep violet reaction product (sample I) having a softening point of 107° C. was obtained. The product was soluble in aqueous alkalies and polar solvents such as methanol and acetone.

REFERENTIAL EXAMPLE 2

Resorcinol (100 parts), 70 parts of the same oily cyclopentadiene polymer as used in Referential Example 1 and 0.2 part of p-toluenesulfonic acid were charged into a four-necked flask, and reacted in the same way as in Referential Example 1. There was obtained a deep violet reaction product having a softening point of 101° C. (sample II). This product was soluble in aqueous alkalies and polar solvents such as methanol and acetone.

REFERENTIAL EXAMPLE 3

Referential Example 1 was followed except that phenol was used instead of pyrogallol. There was obtained a deep violet reaction product having a softening point of 40° C. (sample III). The product was difficultly soluble in aqueous alkalies and methanol, but soluble in acetone and toluene.

REFERENTIAL EXAMPLE 4

Referential Example 1 was followed except that an oily cyclopentadiene homopolymer having a viscosity at 25° C. of 8,000 centipoises was used instead of the cyclopentadiene polymer used in Referential Example 1. There was obtained a deep violet reaction product having a softening point of 110° C. (sample IV). This product was soluble in aqueous alkalies, methanol and acetone.

REFERENTIAL EXAMPLE 5

Referential Example 1 was followed except that the oily cyclopentadiene polymer was not used. A deep violet viscous reaction product (sample V) was obtained. This product was soluble in water.

REFERENTIAL EXAMPLE 6

A four-necked flask was charged with 100 parts of phenol, 10 parts of water, 75 parts of formaldehyde (concentration 35%), 30 parts of an oily cyclopentadiene polymer (a copolymer of 50% dicyclopentadiene and 50% 1,3-pentadiene having a viscosity at 25° C. of about 10,000 obtained by heat polymerization) and 1.6 parts of oxalic acid dihydrate, and in an atmosphere of nitrogen, they were reacted for 2 hours. The reaction temperature was controlled by refluxing and condensing water in the reaction system. After the reaction, 350 ml of distilled water was added. The mixture was cooled, and the water in the upper layer was removed by a siphon. The residue was heated under reduced pressure to dehydrate and concentrate it. When the temperature of the product reached 120° C., the concentration was terminated. There was obtained a novolak-type resin (sample VI). The resin was a yellowish brown clear substance having a softening point of 85° C. and being soluble in aqueous alkalies and polar solvents such as methanol and acetone.

REFERENTIAL EXAMPLE 7

In a four-necked flask, 100 parts of phenol, 30 parts of the same oily cyclopentadiene polymer as used in Referential Example 6 and 0.8 part of aluminum chloride were reacted at 140° C. for 1 hour. Then, 75 parts of formaldehyde (concentration 35%) and 10 parts of water were added, and these materials were reacted for 1 hour under reflux. Then, 400 parts of water was added to wash the reaction mixture. The supernatant liquid was separated, and the resulting reaction mixture was dehydrated and concentrated under a pressure of 75 mmHg. When the temperature of the product reached 150° C., the concentration was terminated. A novolak-type resin (sample VII) was obtained. This resin was a deep brownish substance having a softening point of 75° C., and was soluble in aqueous alkalies and polar solvents such as methanol and acetone.

REFERENTIAL EXAMPLE 8

A four-necked flask was charged with 120 parts of ortho-methylol phenol obtained by reacting 100 parts of phenol with 69 parts of formaldehyde (concentration 35%) in the presence of 3 parts of zinc acetate dihydrate, and 40 parts of the same cyclopentadiene polymer as used in Referential Example 6. In an atmosphere of nitrogen, these materials were maintained at 125° C. for 3 hours while distilling off the water formed. As a result, a viscous oily product was obtained.

The inside of the flask was cooled to 100° C., and 3 parts of salicylic acid was added. The mixture was gradually heated to 150° C. over the course of 3 hours. There was obtained a novolak-type resin (sample VIII). This resin was a yellowish brown clear substance having a softening point of 80° C. and being soluble in aqueous alkalies and polar solvents such as methanol and acetone.

REFERENTIAL EXAMPLE 9

Phenol (100 parts), 20 parts of the same cyclopentadiene polymer as used in Referential Example 6 and 0.8 part of aluminum chloride were charged into a four-necked flask and reacted at 140° C. for 1 hour. Then, 2.3 parts of aqueous ammonia (concentration 28%) was added to decompose aluminum chloride and neutralize the mixture to a pH of 7. Then, 150 parts of formaldehyde (concentration 35%) and 3 parts of aqueous ammonia (concentration 28%) were added, and the reaction was carried out at 80° C. for 1 hour. The reaction mixture was dehydrated under reduced pressure until the gellation time at 150° C. became 4 minutes. There was obtained a resoltype resin which was viscous and deep brown (sample IX).

REFERENTIAL EXAMPLE 10

A four-necked flask was charged with 120 parts of orthomethylolphenol obtained by reacting 100 parts of phenol and 69 parts of formaldehyde (concentration 35%) in the presence of 3 parts of zinc acetate dihydrate, and 40 parts of the same cyclopentadiene polymer as used in Referential Example 6. In an atmosphere of nitrogen, these materials were maintained at 125° C. for 3 hours while distilling off the water formed. A viscous oily product was obtained. Then, 20 parts of resorcinol was added, and after dissolving it completely, 5 parts of salicyclic acid was added. The reaction was carried out at 125° C. for 1.5 hours to give a novolak-type resin (sample X). This resin was a reddish brown clear substance having a softening point of 90° C. and being soluble in aqueous alkalies and polar solvents such as methanol and acetone.

EXAMPLE 1

Sample I was dissolved in a 1% by weight aqueous solution of sodium hydroxide to prepare a coating solution having a solids concentration of 3% by weight. The coating solution was sprayed onto the inner wall of a 1 m³ stainless steel polymerization reactor and other parts of the reactor with which monomer was likely to make contact, at a rate of 0.5 g/m² (as solids; the same basis used hereinafter). The coated surface was washed with deionized water.

The reactor was then charged with 400 kg of deionized water, 180 g of partially saponified product of polyvinyl acetate, 30 g of 2-ethylhexyl peroxydicarbonate and 60 g of tertiary butyl peroxypivalate. After deaeration, 200 kg of vinyl chloride monomer was introduced into the reactor, and polymerized at 58° C. for 12 hours. After the polymerization, the inside of the reactor was washed with water under a weak pressure of 5 to 10 kg/cm², and the state of scale deposition was observed. No scale was found to be deposited on the inside of the reactor, nor were there any adverse effects, such as the retardation of the reaction, the non-uniformity of the particle diameter or the polymer, the coloration of the polymer and the increase of fish eyes in the polymer.

COMPARATIVE EXAMPLE 1

Example 1 was followed except that the coating solution was not used. Scales were found to be deposited on the inside of the polymerization reactor at a rate of 340 g/m².

COMPARATIVE EXAMPLE 2

A 2% toluene solution of the same cyclopentadiene polymer as used in Referential Example 1 was prepared, and coated on the inside of a polymerization reactor at a rate of 0.5 g/m². The coated surface was dried in the air, and by using this reactor, the same polymerization as in Example 1 was performed. After the polymerization, the state of scale deposition was observed. It was found that scales were deposited at a rate of 310 g/m². The result shows that this polymer alone scarcely has an effect of inhibiting scale deposition.

COMPARATIVE EXAMPLE 3

Sample V was dissolved in water to form a coating solution having a solids concentration of 2% by weight. The coating solution was coated on the inside of a polymerization reactor in the same way as in Example 1 and the coated surface was washed with water. Using this reactor, the same polymerization as in Example 1 was performed. After the polymerization, the state of scale deposition was observed. It was found that scales were deposited at a rate of 200 g/m³. The result shows that the viscous reaction product prepared from the phenolic compound alone has little effect of inhibiting scale deposition.

EXAMPLE 2

Example 1 was followed except that sample II was used instead of sample I. No scale deposition on the inside of the reactor was observed, nor were there any adverse effects such as the retardation of the reaction and the degradation of the polymer product.

EXAMPLE 3

Sample III was dissolved in acetone to prepare a coating solution having a solids concentration of 2% by weight, and coated on the inside of a polymerization reactor in the same way as in Example 1. The coated surface was washed with water. Using this reactor, the same polymerization as in Example 1 was performed, and after the polymerization, the state of scale deposition was observed. It was found that scales were deposited at a rate of 150 g/m². The result shows that although the reaction product prepared by using a monohydric phenol is practical, it has a lesser effect of inhibiting scale deposition than in the case of using a polyhydric phenol.

EXAMPLE 4

Example 1 was followed except that sample IV was used instead of sample I. No scale deposition on the inside of the reactor was observed.

EXAMPLE 5

Sample I was dissolved in methanol to prepare a coating solution having a solids concentration of 2% by weight. The coating solution was sprayed at a rate of 1 g/m² on the inside of a 1 m³ stainless steel polymerization reactor and other parts of the reactor with which monomer was likely to make contact. The coated surface was washed with deionized water.

The reactor was then charged with 400 kg of deionized water, 250 g of a partially saponified product of polyvinyl acetate, 150 g of hydroxymethyl propyl cellulose and 100 g of tert,-butyl peroxypivalate. After deaeration, 180 kg of vinyl chloride monomer and 20 kg of vinyl acetate monomer were introduced into the reactor, and polymerized at 60° C. for 15 hours. After the polymerization, the inside of the polymerization reactor was washed with water under a weak pressure of 5 to 10 kg/cm², and the state of scale deposition was observed. No scale was found to be deposited, nor were there any adverse effects, such as the retardation of the reaction, the nonuniformity of the particle diameter of the polymer, and the coloration of the polymer.

COMPARATIVE EXAMPLE 5

Example 5 was followed except that the coating solution was not used. Scales were found to be deposited on the inside of the reactor at a rate of 400 g/m².

EXAMPLE 6

The same coating solution as used in Example 5 was sprayed at a rate of 1.5 g/m² on the inner wall of a 1 m³ stainless steel polymerization reactor and other parts of the reactor with which monomer was likely to make contact. The coated surface was washed with deionized water. The reactor was then charged with 400 kg of deionized water, 1 kg of sodium laurylsulfate and 260 g of potassium persulfate. After deaeration, 200 kg of vinyl chloride monomer was introduced into the reactor, and polymerized at 55° C. for 10 hours. After the polymerization, the inside of the polymerization reactor was washed with water under a weak pressure of 5 to 10 kg/cm², and the state of scale deposition was observed. No scale was found to be deposited.

COMPARATIVE EXAMPLE 6

Example 6 was followed except that the coating solution was not used. Scales were found to be deposited on the inside of the reactor at a rate of 260 g/m².

EXAMPLE 7

The same coating solution as used in Example 5 was sprayed at a rate of 1.5 g/m² on the inner wall of a 10-liter stainless steel autoclave and other parts of the autoclave with which monomer was likely to make contact. The coated surface was washed with deionized water, and dried. Then, 5 kg of vinyl chloride monomer containing 0.02% by weight of azobisisobutyronitrile was introduced into the autoclave, and polymerized at 55° C. for 10 hours. After the polymerization, the state of scale deposition on the inside of the autoclave was observed. No scale was found to be deposited.

COMPARATIVE EXAMPLE 7

Example 7 was followed except that the coating solution was not used. Scales were found to be deposited on the inside of the autoclave at a rate of 490 g/m$^2$.

EXAMPLE 8

Sample VI was dissolved in a 1% by weight aqueous solution of sodium hydroxide to form a coating solution having a solids concentration of 3% by weight. The coating solution was sprayed at a rate of 0.5 g/m$^2$ on the inner wall of a 1 m$^3$ stainless polymerization reactor and other parts of the reactor with which monomer was likely to make contact. The coated surface was washed with deionized water.

Then, the reactor was charged with 400 kg of deionized water, 180 g of a partially saponified product of polyvinyl acetate, 30 g of 2-ethylhexyl peroxydicarbonate and 60 g of tert.-butyl peroxypivalate. After deaeration, 200 kg of vinyl chloride monomer was introduced into the reactor, and polymerized at 58° C. for 12 hours. After the polymerization, the inside of the reactor was washed with water under a weak pressure of 5 to 10 kg/cm$^2$, and the state of scale deposition was observed. No scale was found to be deposited, nor were there any adverse effects, such as the retardation of the reaction, the non-uniformity of the particle diameter of the polymer, the coloration of the polymer, and the increase of fish eyes in the polymer.

EXAMPLES 9 TO 11

Example 8 was followed except that samples VII, VIII and IX were used respectively instead of sample VI. No scale deposition on the inside of the reactor was observed in these runs, nor were there any adverse effects such as the retardation of the reaction and the degradation of the quality of the polymer.

COMPARATIVE EXAMPLE 8

Example 8 was followed except that the coating solution was not used. Scales were found to be deposited on the inside of the reactor at a rate of 300 g/m$^2$.

COMPARATIVE EXAMPLE 9

A 2% toluene solution of the same cyclopentadiene polymer as used in Referential Example 6 was prepared, and coated on the inside of a polymerization reactor at a rate of 0.5 g/m$^2$. The coated surface was dried in the air. By using this reactor, the same polymerization as in Example 8 was carried out, and after the polymerization, the state of scale deposition was observed. Scales were found to be deposited at a rate of 280 g/m$^2$. The result shows that the cyclopentadiene polymer alone has no effect of inhibiting scale deposition.

COMPARATIVE EXAMPLE 10

The intermediate, ortho-methylol phenol, prepared in Referential Example 8 was dissolved in a 1% by weight aqueous solution of sodium hydroxide to prepare a coating solution having a solids concentration of 3% by weight. Subsequently, the coating solution was coated on the inside of a polymerization reactor in the same way as in Example 8. The coated surface was washed with water, and then the same polymerization as in Example 8 was performed. After the polymerization, the state of scale deposition was observed. Scales were found to be deposited at a rate of 200 g/m$^2$. The result shows that the orthomethylol phenol alone has little effect of inhibiting scale deposition.

EXAMPLE 12

Sample VIII was dissolved in acetone to prepare a coating solution having a solids concentration of 2% by weight. The coating solution was then sprayed at a rate of 1 g/m$^3$ on the inner wall of a 1 m$^3$ stainless steel polymerization reactor and other parts of the reactor with which monomer was likely to make contact. The coated surface was washed with deionized water, and then the reactor was charged with 400 kg of deionized water, 1 kg of sodium laurylsulfate and 260 g of potassium persulfate. After deaeration, 200 kg of a vinyl chloride monomer was introduced into the reactor, and polymerized at 55° C. for 10 hours. After the polymerization, the inside of the reactor was washed with water under a weak pressure of 5 to 10 kg/cm$^2$, and the state of scale deposition was observed. No scale was found to be deposited.

COMPARATIVE EXAMPLE 11

Example 12 was followed except that the coating solution was not used. Scales were found to be deposited on the inside of the reactor at a rate of 250 g/m$^2$.

EXAMPLE 13

The same coating solution as used in Example 12 was sprayed at a rate of 1.5 g/m$^2$ onto the inner wall of a 10-liter stainless steel autoclave and other parts of the autoclave with which monomer was likely to make contact. The coated surface was washed with deionized water and dried. Then, 5 kg of vinyl chloride monomer containing 0.02% by weight of azobisisobutyronitrile was introduced into the autoclave, and polymerized at 55° C. for 10 hours. After the polymerization, the state of scale deposition on the inside of the autoclave was observed. No scale was found to be deposited.

EXAMPLE 14

Sample X was dissolved in methanol to prepare a coating solution having a solids concentration of 2% by weight. The coating solution was coated at a rate of 1 g/m$^2$ on the inner wall of a 1 m$^3$ stainless steel polymerization reactor and other parts of the reactor with which monomer was likely to make contact. The coated surface was washed with deionized water. Then, the polymerization reactor was charged with 400 kg of deionized water, 250 g of a partially saponified product of polyvinyl acetate, 150 g of hydroxymethylpropyl cellulose and 100 g of tetrabutyl peroxypivalate. After deaeration, 180 kg of vinyl chloride monomer and 20 kg of vinyl acetate monomer were introduced into the reactor and polymerized at 60° C. for 15 hours. After the polymerization, the inside of the reactor was washed with water under a weak pressure of 5 to 10 kg/cm$^2$, and the state of scale deposition was observed. No scale was found to be deposited, nor were there any adverse effects such as the retardation of the reaction, the non-uniformity of the particle size of the polymer, and the coloration of the polymer.

COMPARATIVE EXAMPLE 12

Example 14 was followed except that the coating solution was not used. Scales were found to be deposited at a rate of 390 g/m² on the inside of the polymerization reactor.

What we claim is:

1. A process for producing a vinyl chloride polymer which comprises polymerizing vinyl chloride monomer or a mixture of it with another monomer copolymerizable therewith in an aqueous medium or in bulk, characterized in that the inside of the polymerization reactor is coated beforehand with the product of reaction of an oily or waxy cyclopentadiene polymer with a phenolic compound.

2. The process of claim 1 wherein the phenolic compound is a polyhydric phenol.

3. The process of claim 1 wherein the reaction product of the cyclopentadiene polymer and the phenolic compound is obtained by reacting 100 parts by weight of the phenolic compound with 5 to 200 parts by weight of the cyclopentadiene polymer.

4. The process of claim 1 wherein the reaction product of the cyclopentadiene polymer and the phenolic compound is obtained by reacting them in the presence of an acid catalyst at 120° to 200° C. for 5 minutes to 10 hours.

5. The process of claim 1 wherein the reaction product of the cyclopentadiene polymer and the phenolic compound is coated in the form of an alkaline aqueous solution or an organic solvent solution.

6. The process of claim 1 wherein the polymerization is carried out in a suspension polymerization mode.

7. The process of claim 1 wherein the polymerization is carried out in an emulsion or emulsion-suspension polymerization mode.

8. A process for producing a vinyl chloride polymer which comprises polymerizing vinyl chloride monomer or a mixture of it with another monomer copolymerizable therewith in an aqueous medium or in bulk, characterized in that the inside of the polymerization reactor is coated beforehand with the product of reaction of an oily or waxy cyclopentadiene polymer, a phenolic compound, and an aldehyde compound.

9. The process of claim 8 wherein the phenolic compound is a monohydric phenol.

10. The process of claim 8 wherein the reaction product of the cyclopentadiene polymer, the phenolic compound and the aldehyde compound is obtained by first reacting the phenolic compound and the aldehyde compound, and then reacting the reaction product with the cyclopentadiene polymer under heat.

11. The process of claim 8 wherein the reaction product of the cyclopentadiene polymer, the phenolic compound and the aldehyde compound is coated in the form of an alkaline aqueous solution or an organic solvent solution.

12. The process of claim 8 wherein the polymerization is carried out in a suspension polymerization mode.

13. The process of claim 8 wherein the polymerization is carried out in an emulsion or emulsion-suspension polymerization mode.

14. In a process for producing a vinyl chloride polymer by polymerizing vinyl chloride monomer or a mixture of a vinyl chloride monomer with another monomer copolymerizable therewith in an aqueous medium or in bulk in a polymerization reactor having an adherent internal coating thereon for preventing deposition of polymer scales on the inside of the polymerization reactor; and improvement wherein said adherent internal coating comprises a reaction product selected from the group consisting of
   (1) the product of reaction of an oily or waxy cyclopentadiene polymer with a phenolic compound; and
   (2) the product of reaction of an oily or waxy cyclopentadiene polymer, a phenolic compound, and an aldehyde compound;
and wherein said coating is present in an amount of at least 0.001 g/m², as solids.

15. The process of claim 14 wherein said internal coating comprises the reaction product (1) obtained by reacting 100 parts by weight of a polyhydric phenol with 5 to 200 parts by weight of the cyclopentadiene polymer in the presence of an acid catalyst at 120° to 200° C. for 5 minutes to 10 hours.

16. The process of claim 14 wherein said coating comprises the reaction product (2) which is obtained by first reacting a monohydric phenol and the aldehyde compound, and then reacting the reaction product with the cyclopentadiene polymer under heat.

* * * * *